United States Patent
Eckhart et al.

(10) Patent No.: US 7,108,831 B2
(45) Date of Patent: Sep. 19, 2006

(54) MONOPHASIC TUNGSTEN CARBIDE

(75) Inventors: Jürgen Eckhart, Althofen (AT); Jürgen Leitner, Althofen (AT); Kurt Rabitsch, Althofen (AT)

(73) Assignee: Treibacher Industrie AG, Treibach-Althofen (AT)

( * ) Notice: Subject to any disclaimer, the term of this patent is extended or adjusted under 35 U.S.C. 154(b) by 537 days.

(21) Appl. No.: 10/465,310

(22) Filed: Jun. 19, 2003

(65) Prior Publication Data

US 2004/0109812 A1    Jun. 10, 2004

Related U.S. Application Data

(63) Continuation of application No. PCT/AT01/00399, filed on Dec. 20, 2001.

(30) Foreign Application Priority Data

Dec. 20, 2000    (AT) .............................. A 2115/2000

(51) Int. Cl.
  *C01B 31/34* (2006.01)
  *C04B 35/56* (2006.01)
  *C22C 29/02* (2006.01)
  *C22C 29/08* (2006.01)

(52) U.S. Cl. ........................................ 419/18; 423/440

(58) Field of Classification Search ................ 423/440; 419/18
See application file for complete search history.

(56) References Cited

U.S. PATENT DOCUMENTS

| | | | | |
|---|---|---|---|---|
| 4,049,380 A | * | 9/1977 | Yih et al. ................. | 428/539.5 |
| 5,372,797 A | | 12/1994 | Dunmead ................... | 423/430 |
| 5,380,688 A | | 1/1995 | Dunmead et al. ............. | 501/87 |
| 5,885,372 A | | 3/1999 | Seegopaul ................... | 148/237 |
| 6,030,912 A | * | 2/2000 | Yamamoto et al. ........... | 501/87 |

FOREIGN PATENT DOCUMENTS

| CA | 2350576 | 5/2000 |
|---|---|---|
| EP | 0 834 589 A1 | 4/1998 |
| EP | A 1 016 624 A1 | 7/2000 |
| JP | 3252306 | 11/1991 |
| WO | WO A 93/10042 | 5/1993 |
| WO | 0029325 | 5/2000 |

OTHER PUBLICATIONS

F. H. Ribeiro, R. A. Dalla Betta, G. J. Guskey, M. Boudart Preparation and surface composition of tungsten carbide powders with high specific surface area Chem. Mater.; 1991; 3(5): 805-812.*

Deutsch Chemische Gesellschaft: "Gmelins Handbuch der anorganischen Chemie, System-Nr 54: Wolfram, Hauptband, 8. Auflage" 1933, Verlag Chemie GMBH, Weinheim, Seite 190, Zeile 2-10.

Erik Lassner, Wolf-Dieter Schubert, Tungsten Properties, Chemistry, Technology of the Element, Alloys and Chemical Compounds, Kluwer Academic, Plenum Publishers, New York 1999, pp. 88 109 and 330-331.

Qian, Chongliang and Wu, Enxi, "Phase transition of W-Co oxide mixture during deirect reduction/carburization by $H_2/CH_4$", Transactions of Nfsoc, vol. 5, No. 3, 1995, pp. 554-560.

Alonso et al., "Tungsten trioxide reduction-carburization with carbon monoxide-carbon dioxide mixtures: kinetics and thermodynamics", Internal Journal of Mineral Processing, 20, 1987, pp. 137-151.

Davidson et al., "Initial Kinetics of tungsten carburization by methane", Metallurgic Transactions B. vol. 9B, 1978, pp. 553-557.

A.K. Basu and F.R. Sale, "A morphological study of the carburization/reduction of tungsten oxides with carbon monoxide", Metallurgic Transactions B. vol. 9B, 1978, pp. 603-613.

"Ullmann's Encyclopedia of Industrial Chemistry", 5th Edition, vol. A5, VCH: 65-68.

* cited by examiner

*Primary Examiner*—Wayne A. Langel
*Assistant Examiner*—Alvin T Raetzsch
(74) *Attorney, Agent, or Firm*—Baker Botts LLP

(57) ABSTRACT

The present invention relates to a method of producing tungsten carbide by gas phase direct carburization of a tungsten-oxide containing starting material, wherein the starting material is reacted with a reaction gas at an increased temperature. The starting material is first heated to a first temperature greater than or equal to 600° C., before reacting with a reaction gas while increasing the temperature to a second temperature that does not exceed 850° C., wherein the reaction gas is selected from the group consisting of CO and a $COH_2$ gas mixture comprising up to 20% by volume $H_2$.

4 Claims, 1 Drawing Sheet

MONOPHASIC TUNGSTEN CARBIDE

CROSS REFERENCE TO RELATED APPLICATION(S)

The present application is a continuation of International Patent Application No. PCT/AT01/00399, filed Dec. 20, 2001, published in German on Jun. 27, 2002 as International Patent Publication No. WO02/49986, which claims priority to Austrian Application No. A 2115/2000, filed Dec. 20, 2000, all of which are incorporated in their entireties herein.

The invention relates to a method of producing tungsten carbide by gas phase direct carburization of a powdery, tungsten-oxide containing starting material, wherein the starting material is reacted with a reaction gas at an increased temperature.

Wear-resistant and hard tools are widely produced from hard metal. Hard metal is a powder-metallurgically produced composite material consisting of a hard-material phase bearing the wear and a tenacious binder. Due to excellent material properties, the predominant majority of hard metals that are produced have a hard-material phase consisting of tungsten carbide and a binder phase consisting of cobalt.

Optimization of said composite material toward greater hardness and increased tenacity is achieved by using finer and finer tungsten carbides. The requirements for those new fine raw materials are:

The hard-material phase must be usable with the large-scale processing steps that are conventional at present: wet grinding involving cobalt, subsequent drying and partial granulation of the charge stock, followed by pressing or extruding in order to produce slugs and subsequent sintering.

A monophase raw material with a precisely adjusted bound carbon content without any content of free carbon.

Small homogeneous particle sizes with a particularly narrow grain-size distribution.

When being prepared with cobalt during sintering, the product should not exhibit any irregular growth phenomena of individual particles.

An intermediate product readily available on the world market should be usable as a raw material for the production of said hard-material phase.

The costs for producing said hard material should remain within economic limits so that no replacement material must be found.

A method of producing tungsten carbide which is frequently used on an industrial scale is known from Ullmann's Encyclopedia of Industrial Chemistry, $5^{th}$ Edition, Vol. A5, VCH. Said method involves two process steps based on tungsten blue or tungsten yellow oxide.

In the first step, tungsten blue oxide or tungsten yellow oxide is reduced with hydrogen. To that end, the starting material is sent through a pusher furnace in saggers or is made to trickle through a rotary furnace. Thereby, hydrogen is usually charged in counterflow. It reduces the oxide under the formation of water vapour. Grain-size adjustment is effected by adjusting the water vapour partial pressure. Dry conditions as caused by small charges of tungsten oxide, large hydrogen flows and low temperatures will result in a fine tungsten powder. Wet conditions involving high oxide charges, small hydrogen flows and high temperatures will result in a coarse tungsten powder.

In a second step, the tungsten powder thus obtained is mixed with carbon black at a certain ratio and is carburated in a pusher furnace at temperatures of around 1200° C.–2000° C. In doing so, the grain size of the WC powder thus obtained is determined already in the first process step, i.e. during reduction.

The method is profitable if standard grain sizes in the range of 2–6 µm are produced, however, it reaches the limits of profitability if very small grain sizes (<1 µm) are produced, since the charges of tungsten oxide have to be reduced further and further. Another disadvantage of said method arises from the pyrophoric properties of the produced tungsten powder, which, in particular with grain sizes <1 µm, render handling of said powder very difficult and, in case of even smaller grain sizes, also dangerous.

Furthermore, direct carburization methods are known wherein a tungsten-oxide containing powder is not at first reduced to tungsten and then carburated with carbon black but wherein the oxide-containing starting material is reacted to WC directly with carbon carriers.

The reaction kinetics of gas phase carburization with a hydrogen/methane mixture is described in Metallurgical Transactions B, Vol. 9B, 1978, pages 553–557. The phase transition of a W-Co-oxide-mixture during the direct reduction/carburization with hydrogen/methane is known from Transactions of Nfsoc, Vol. 5, No. 3, 1995, pages 554–560. The kinetics and thermodynamics of tungsten-trioxide reduction/carburization with a $CO/CO_2$ mixture is described in the International Journal of Mineral Processing, 20, 1987, pages 137–151. Morphological studies on the carburization/reduction of tungsten oxides with carbon monoxide are known from Metallurgical Transactions B, Vol. 9B, 1978, pages 603-613.

In JP-A-3252306, a method is described according to which a $WO_3$-powder and carbon black are mixed at a certain ratio under the addition of water, are pelletized and dried. Direct carburization is performed in two subsequently arranged rotating tubes, wherein reduction under a nitrogen atmosphere takes place in the first rotating tube at temperatures of from 1000° C. to 1600° C. whereas in the second tube carburization under hydrogen takes place at from 1400° C. to 2000° C. The hydrogen-free reduction in the first rotating tube prevents the crystal growth of the tungsten particle. The reaction channel takes the path $WO_3 \rightarrow WO_{2.9} \rightarrow WO_{2.72} \rightarrow WO_2 \rightarrow W \rightarrow W_2C \rightarrow WC$. In order to properly meet the carbon balance (appx. 6.13% by weight of C), it is necessary to precisely control the temperatures and atmospheres in the two-stage process. The WC produced according to said method has a specific surface of from 3.0 to 3.5 $m^2/g$ and a grain size of 0.15 µm.

One of the disadvantages of said method arises from the fact that it consists of several stages. Furthermore, said method requires very high plant temperatures and hence makes high demands on the plant. In addition, it is necessary to agglomerate the starting oxide with the carbon material prior to carburization.

The "Rapid Carbothermal Reduction" (RCR) process, known from U.S. Pat. No. 5,380,688, is a variant of direct carburization, wherein a fine-grained WC-powder is produced continuously from graphite in a gravity reactor by means of an extremely fast carbothermal reduction of tungsten oxide.

Said process proceeds in two stages: The first stage ("entrainment method") yields a substoichiometric $WC_{1-x}$ powder. Thereby, the $WO_3/C$ powder mixture falls due to gravity through a vertical tube furnace under an inert gas atmosphere at temperatures of from 1800° C. to 200020 C. The heating rate is between 10000 and 100 000 000 K/s, the retention time of the particles in the heating zone amounts to around 0.2 to 10 seconds, whereby a very small grain size is achieved. In a second step, the amount of carbon that is still necessary is added. The mixture falls into a heated crucible ("drop method"). The heating rate amounts to around 100 to 10 000 K/s, the retention time is between 5 minutes and 2 hours. The tungsten carbide produced according to said method has a grain size of from 0.2 to 0.4 µm.

It is a drawback that also this method consists of more than one step. Due to the high process temperatures, the demands on the plant are very high. A further disadvantage consists in that the material has to be analyzed after the first step so as to be able to determine the amount of carbon that is still necessary.

Moreover, methods are known in the state of the art wherein, instead of carbon black as the reducing and carburating agent, the necessary carbon is provided by gaseous carbon carriers (hydrocarbon gas, $CO/CO_2$ mixture) in a reducing atmosphere. However, those methods have so far not been realized on an industrial scale.

A method of producing tungsten carbide is also known from WO-A-93/10042. According to said method, a tungsten carbide powder is obtained with an average grain diameter of from 0.05 to 0.2 µm. The reaction of $WO_3$ to WC takes place in two process steps under a flowing atmosphere consisting of molecular hydrogen and from 3 to 8% by volume of molecular methane.

The first part of the process consists in the reduction. Thereby, the powder is heated from 25° C. to 535° C. at a rate of from 5° C. to 50° C. per minute. In the second part (carburization), heating is continued to 850° C., at a heating rate of from 1° C. to 10° C. per minute. Upon reaching a temperature of 850° C., that temperature is maintained until the conversion of the starting material into WC has been completed. That time period typically lasts between 15 minutes and 3 hours.

According to the Examples mentioned in that patent specification, the tests were carried out on thermoanalytical scales and in a laboratory microfurnace only on a gram scale.

Said method exhibits a drawback in that it is not comprehensible for a person skilled in the art how it could be feasible to achieve in conventional production plants the required precise temperature control as well as adherence to the water vapour partial pressure in the range of a powder-bed amount that is interesting on a technical scale. Furthermore, it is not possible to infer any kind of method from the specification by means of which the grain size could be adjusted selectively in the defined range.

In EP-A-1 016 624, a gas carburization method for producing a fine-grained WC powder from a non-granulated, flowable tungsten- or tungsten-oxide containing powder having an average grain size of $d_{50}>10$ µm in fluidized-bed reactors is described. In a fluidized-bed reaction chamber under a protective gas atmosphere, the material to be carburated is continuously brought to a constant process temperature of from 900° C. to 1200° C. at a heating rate of between 1° C. and 50° C. per minute. Upon reaching said process temperature, switching-over to the process gas is performed. Said gas consists of from 10 to 100% by volume of $CO_x$ (x=1 or 2), the remainder is $H_2$ or from 0.1 to 5% by volume of hydrocarbon gas. Optionally, small amounts of $H_2O$ vapour are added. Throughout the entire duration of the process, the carbon activity ac is supposed to be <1 at process temperature and as close to 1 as possible. This latter requirement rules out the production of tungsten carbide with a process gas consisting of 100% CO, since that would result in carbon activity $a_c>1$.

According to the specification, the WC powder this obtained exhibits no foreign phases that would be detectable in an XRD (X-ray diffraction) analysis, has an average primary grain size of >0.2 µm and <5 µm, a carburization degree of >96% and a content of free carbon of <0.1% by weight.

Times of <60 minutes are indicated as an advantageous process duration in case W powder is taken as the material to be carburated. If a tungsten-oxide containing powder is taken, the process duration should last for <100 minutes.

The described method has the disadvantage that a person skilled in the art is not able to derive any method whatsoever by means of which it would be feasible to selectively adjust the grain size in the defined range. For instance, it is not possible to infer from the specification how it might be feasible to produce a WC<0.55 µm from tungsten oxide. It is a further disadvantage that, according to our own experience gained with the preferred paramaters mentioned in that document, the reduction properties of the carbon monoxide outbalance the carburization capability at temperatures of >900° C. Thus, in some trials tungsten metal, instead of tungsten carbide, was formed at such high temperatures. Another disadvantage consists in that wet conditions arise due to the disclosed choice of the gas composition whereby hydrocarbons, hydrogen or water vapour are added, leading to growth phenomena beyond the gas phase, caused by the formation of a tungsten-oxide hydrate.

A method of the initially described kind is known from WO-A-00/29325. In said method, a substantially complete carburization of tungsten precursor compounds is achieved within a temperature range of from 800° C. to 1000° C., preferably from 850° C. to 950° C., wherein a $CO/CO_2$ mixture is used as a reaction gas. Said carburization gas has a $CO_2$-content, based on CO and $CO_2$, which is equal to the carburization temperature above the Boudouard balance, i.e. carbon activity ac is smaller than 1.

A tungsten oxide powder is heated in a sintering furnace under an $N_2$ atmosphere, is switched over to the reaction gas at a temperature of 500° C. and is heated further to the preferred reaction temperature of from 900° C. to 950° C. During the reaction, the $CO_2/CO$-partial pressure ratio should not exceed 1:8. In order to maintain said $CO_2/CO$-ratio, the $CO_2$ formed during reduction and carburization is withdrawn. At carburization temperature, the duration of carburization preferably lasts from 5 to 8 hours.

Following carburization, the tungsten carbides that have been obtained are heat-treated. To that end, the tungsten carbides are heat-treated in a pushed-batt kiln for a duration of preferably from 25 to 50 minutes at preferred temperatures of from 1350° C. to 1450° C.

The described tungsten carbide is characterized by a relation between coherent length x and lattice distorsion y according to the following formulas:

$$y<(-4.45*10^{-4} \text{ nm}^{-1}*x+0.113)\%$$

$$y<(-2.5*10^{-4} \text{ nm}^{-1}*x+0.1025)\% \text{ and}$$

$$y<(-7.78*10^{-4} \text{ nm}^{-1}*x+0.1395)\%$$

The described method involves the disadvantage that a person skilled in the art is not able to derive any method whatsoever by means of which it might be feasible to selectively adjust the grain size in the defined range.

SUMMARY OF THE INVENTION

The invention aims at overcoming the above mentioned problems and disadvantages and has as its object to provide a method which enables the production of a submicron tungsten carbide powder of a defined FSSS (=Fisher Sub Sieve Size) grain size in an economic, ecological and efficient manner. In particular, it should be possible to carry out the production in a single process step and to adjust an FSSS grain size, especially in the range of from 0.3 to 0.9 µm, in a reproducible manner. Furthermore, the demands on the production plant in terms of thermal stress should be lower than in the state of the art.

According to the invention, said object is achieved in that the tungsten-oxide containing starting material is heated to at least 600° C. and is then reacted with the reaction gas mixture while increasing the temperature to a maximum temperature of up to 850° C., wherein a reaction gas is used which consists of CO or is a $CO/H_2$ gas mixture that contains up to 20% by volume of $H_2$. It is evident to a person skilled in the art that, at the indicated reaction temperatures, C and $CO_2$, which then will also be present in the reaction mixture, will form from the CO that is used according to the Bouduard balance.

DETAILED DESCRIPTION OF THE INVENTION

Figure 1:
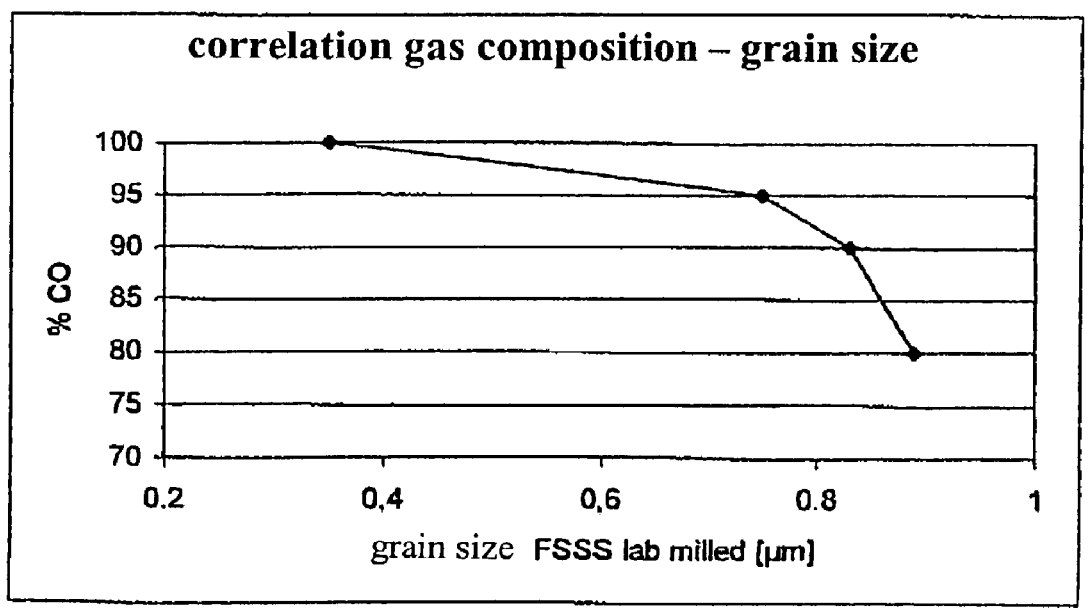
FIG. 1 is a graph showing the correlation between gas composition and gas size of tungsten carbides of the present invention.

The present invention relates to a method of producing tungsten carbide by gas phase direct carburization of a tungsten-oxide containing starting material, wherein the starting material is reacted with a reaction gas at an increased temperature. The starting material is first heated to a first temperature greater than or ecjual to 600° C. Then, the heated starting material is reacted with a reaction gas while increasing the temperature to a second temperature that does not exceed 850° C., wherein the reaction gas is selected from the group consisting of CO and a $COH_2$ gas mixture comprising up to 20% by volume $H_2$.

In an embodiment of the invention, the method is carried out in one step.

In another embodiment of the invention, the starting material is heated to a first temperature greater than or equal to 600° C. in a protective gas atmosphere. An example of such a gas includes, but is not limited to, Ar.

In a further embodiment of the invention, the heated starting material in the presence of a reaction gas is heated to a second temperature that does not exceed 850° C. at a rate of 40–55° C./hour.

In yet another embodiment of the invention, heating of the starting material in the presence of a reaction gas occurs in a fluidized bed furnace.

Another object of the invention is a tungsten carbide obtainable in accordance with the method according to the invention as well as a hard metal manufactured by using said tungsten carbide.

Furthermore, the tungsten carbide according to the invention is characterized in that it has a lattice distance x in the c-direction of $2.850 < x \leq 2.870$ Angstrom (Å).

A preferred embodiment if the tungsten carbide according to the invention is characterized in that the content of bound carbon is in the range of from 5.86% by weight to 6.08% by weight and that it is monophasic. The term "monophasic" as used in the present specification and claims means that no $W_2C$ phase can be detected by means of the standard X-ray diffraction analysis described below.

Tungsten carbide which is produced in accordance with the methods known in the state of the art exhibits a $W_2C$ content of about 4.4% whereas its content of bound carbon amounts to 6.0%. Said foreign phase is disadvantageous in terms of processing the tungsten carbide to a hard metal.

Another preferred embodiment of the tungsten carbide according to the invention consists in that it is provided in the form of platelets and is obtainable in accordance with a method wherein a reaction gas consisting of CO is used.

Depending on the reaction gas, there are two different ways of reacting the tungsten-oxide containing starting material to tungsten carbide, whereby each way leads to a different grain size. The resulting grain size of the WC powder mainly depends on two process parameters: temperature and water vapour partial pressure. High process temperatures as well as a high water vapour partial pressure result in a coarsening of the grains.

According to the present invention, direct carburization take place at relatively low temperatures, ranging from 600° C. to a maximum temperature of 850° C., in order to obtain the finest possible grain. Initiating the reaction at a low temperature (600° C.) is an important issue for the production of very small grain sizes. It has been shown that, in doing so, the exothermic properties as well as the intensity of the reaction are attenuated and the formation of agglomerates may be prevented. The desired grain coarsening within the range of from 0.3 to 0.9 µm (measured by Fisher Sub Sieve Size, FSSS) is achieved in that an appropriate water vapour partial pressure is adjusted by precisely metering hydrogen into the reaction gas.

During the reaction with 100% CO as the reaction gas, CO serves both as a reducing and as a carburating agent. $CO_2$, which does not contribute to grain coarsening, arises as the only gaseous reaction product. During said "dry" direct carburization, the reaction channel takes the path:

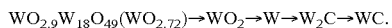

$$WO_{2.9}W_{18}O_{49}(WO_{2.72}) \rightarrow WO_2 \rightarrow W \rightarrow W_2C \rightarrow WC.$$

By combining low reaction temperatures with an absence of water vapour, the smallest FSSS grain size of 0.35 µm is achieved as illustrated in the subsequent Example 1.

By doping the tungsten oxide with chromiferous and/or vanadiferous compounds, an even finer powder is obtained at the above-mentioned dry reaction conditions, for which powder, however, a characterization of the grain size according to the FSSS method is no longer reasonable.

Direct carburization with a carbon monoxide/hydrogen gas mixture yields water vapour as a gaseous reaction product during the reduction step.

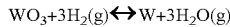

$$WO_3 + 3H_2(g) \leftrightarrow W + 3H_2O(g)$$

In this kind of "wet" direct carburization, reduction is performed partially according to the mechanism of the CVT ("chemical vapour transport") process (Erik Lassner, Wolf-Dieter Schubert; "Tungsten, Properties, Chemistry, Technology of the Element, Alloys and Chemical Compounds", Kluwer Academic/Plenum Publishers, New York 1999), whereby it is rendered possible to control the grain size. The larger the supply of hydrogen, the higher the water vapour partial pressure and, in turn, the larger grain size. The correlation is represented in FIG. 1 which shows the grain size of the tungsten carbides according to the invention, produced in Examples 1, 2, 3 and 5.

Samples drawn during the reaction and analyzed by means of an X-ray diffraction analysis show that the charge to be carburated, in contrast to the cited prior art, is not completely reduced at first and only then carburated (EP-A-1 016 624) but that reduction and carburization always proceed in parallel under reaction conditions according to the invention. As illustrated in Example 1, W and $W_2C$ are detected already during the first sample taking; the major part of the material is still provided as an oxide.

Another surprising feature of the present invention were the reaction times in comparison with the cited prior art. Extremely fast reductions and relatively slow carburizations are described there. For instance, in the specification of patent application EP-A-1 016 624 it is disclosed that the process duration amounts to <60 minutes, in case a W powder is taken as the charge to be carburated, whereas it amounts to <100 minutes, in case a tungsten-oxide containing powder is taken. That allows the conclusion that the complete reduction of the tungsten oxide to a W powder takes place within 40% of the reaction time and that carburization requires 60% of the reaction time.

By way of the present invention it was shown that, in the first 80% of the reaction time, the tungsten is largely provided in its oxidic form, as the reaction time progresses in these 80%, there of course is an increase in the contents of W, $W_2C$ and WC. The complete conversion of the tungsten and the $W_2C$ into WC is carried out very quickly in the last 20% of the reaction time. The time data as cited in the state of the art, which are the opposite of those of the present invention, can be explained in that the tests and assays forming the basis of the state of the art were carried out almost exclusively on thermoanalytical devices on a gram scale, whereby it is not possible, without any problems, to transfer the results gained therefrom to assays performed on a pilot scale.

The method according to the invention may be carried out both continuously and batch-wisely. In case of a continuous operation, it is necessary to make sure that the charge discharged from the reactor may cool down under a protective gas atmosphere, since otherwise reoxidation to tungsten oxide will occur. If the method is carried out batch-wisely, the process gas is switched off after the reaction has been completed, and the product cools down in the fluidized-bed reactor while being flushed with a protective gas.

Tungsten yellow oxide, tungsten blue oxide and ammonium parawolframate are suitable starting materials for the method according to the invention. Said materials may be doped with chromiferous or vanadiferous compounds already prior to direct carburization, whereby it is rendered possible to adjust even finer grain sizes.

A measurement of the lattice constants of the material produced according to the invention by means of X-ray diffraction showed an enlargement of lattice constant c, as opposed to data published in the relevant literature, which enlargement may be used for characterizing the new material.

In the following, the invention is illustrated further by way of examples.

The test for the monophase state was carried out by means of an X-ray diffraction analysis, with a device of Messrs. Phillips (type: PW 1080) being used. The device consists of generator PW 1732/10, the diffraction tube comprising Cu-anode PW 2272/20 (maximum load 2.2 kW), goniometer PW 1050/37, diffractometer control unit PW 3710, display PW 3719 for angles and pulses. Typical measuring conditions for measuring $W_2C$ in WC:

| | |
|---|---|
| Starting angle: | 38.5° |
| Final angle: | 41.0° |
| Lattice pitch: | 0.020° |

The lattice constants were measured with a powder diffractometer of type Siemens D501 by means of Theta/2Theta Scans (measuring conditions: radiation: CuK alpha; monochromatization: Ni-filter; divergent diaphragms: 1°; detector input diaphragm: 0.15°; lattice pitch in the Theta/2Theta Scan: 0.05°; measuring time per measuring step: 1s).

EXAMPLE 1

In a fluidized-bed furnace (diameter 150 mm), 5 kg of technical tungsten blue oxide was fluidized while being flushed with Ar (13 l/min), was heated to a temperature of 300° C. within 40 minutes and was held at that temperature for 45 minutes in order to drive out any remaining ammonia. After that holding point, the tungsten blue oxide was heated further to 600° C. (duration 1 hour). Upon reaching said temperature, switching-over to the process gas (100% CO, 15 l/min) was performed, and, at a heating rate of 40° C./hour, heating was continued to a process temperatures of 820° C. At said temperature, the CO-throughput was increased to 22 l/min. After 10 hours at 820° C., the reaction was completed. Two samples were drawn during the process; the first one, 4 hours after switching over to the reaction gas, the second one, 2 hours before the completion of the reaction. The analysis of the first sample mainly exhibited $WO_2$ and $W_{18}O_{49}(WO_{2.72})$ and traces of $W_2C$. The second sample mainly consisted of $W_2C$, furthermore, $WO_2$, W and WC were provided in about the same amounts. Upon switching off the reaction gas, the furnace cooled down to room temperature while being flushed with Ar. The yield was about 3 kg of powder (remainder discharge), which could be identified as a tungsten carbide consisting of only one single phase by means of an X-ray diffraction analysis and which distinguished itself by the following analytical values:

| | |
|---|---|
| $C_{ges}$: | 6.06% |
| $C_{free}$: | 0.03% |
| O: | 0.38% |
| FSSS ASTM B 330 - 88: | 4.5 μm |
| FSSS lab milled ASTM B 430: | 0.35 μm |

The lattice constants of this WC were determined and were compared with the literature data. For lattice constant a, the value 2.901 Å±0.001 Å, corresponding to the literature data, was determined. Regarding the value of lattice constant c, an enlargement in comparison with the literature data was determined; the value for c amounts to 2.862 Å±0.000 Å.

Literature Data (in Each Case in Å) of WC Produced in a Conventional Manner:

ICSD (Inorganic Crystal Structure Database)

(Fachinformationszentrum Karlsruhe/Germany, in Cooperation with the National Institute of Standard and Technology/USA, Version 1997)

| | | |
|---|---|---|
| a = 2.906 | c = 2.836 | (year 1946) |
| a = 2.907 | c = 2.836 | (year 1961) |

JCPDS-International Centre for Diffraction Data

| JCPDS No. | c | year |
|---|---|---|
| 02-1055 | 2.85 | 1926 |
| 03-1096 | 2.8366 | 1954 |
| 05-0728 | 2.84 | 1949 |
| 25-1047 | 2.8378 | 1973 |
| 72-0097 | 2.8366 | 1961 |
| 73-0471 | 2.8369 | 1947 |

EXAMPLE 2

The test was carried out in analogy to Example 1, however, the process gas had the following composition: 95% CO and 5% $H_2$. Upon reaching a starting temperature of 600° C., switching-over to the process gas was performed, and, at a heating rate of 45° C./hour, heating was continued to a reaction temperature of also 820°. The maximum CO-throughput was reached at 24 l/min. The reaction time at that temperature amounted to 9 hours.

Analytical Values:

| | |
|---|---|
| $C_{ges}$: | 5.74% |
| $C_{free}$: | 0.07% |
| O: | 0.41% |
| FSSS ASTM B 330 - 88: | 3.85 μm |
| FSSS lab milled ASTM B 430: | 0.75 μm |

EXAMPLE 3

Charge stock and holding point were the same as in Example 1, however, the process gas consisted of 90% CO and 10% $H_2$. Beginning with the starting temperature (600° C.), heating to a process temperature of, in this case, 800° C. was performed at a rate of 54° C./hour. The reaction at 800° C. lasted for 12 hours (CO-throughput 16 l/min). Upon cooling down to room temperature under Ar-flushing, a tungsten carbide having the following analytical values was obtained:

| | |
|---|---|
| $C_{ges}$: | 6.07% |
| $C_{free}$: | 0.07% |
| FSSS ASTM B 330 - 88: | 3.95 μm |
| FSSS lab milled ASTM B430: | 0.83 μm |
| Lattice constant a: | 2.903 Å ± 0.001 Å |
| Lattice constant c: | 2.851 Å ± 0.001 Å |

No $W_2C$ phase could be determined.

EXAMPLE 4

The charge stock was 7.5 kg of tungsten blue oxide for the production of a sufficient amount of material for hard metal tests. Holding point and process gas were the same as in Example 1. Beginning with the starting temperature (600° C.), heating to a process temperature of, in this case, 800° C. was performed at a rate of 54° C./hour. The reaction at 800° C. lasted for 12 hours (CO-throughput 16 l/min). Upon cooling down to room temperature under Ar-flushing, a tungsten carbide having the following analytical values was obtained:

| | |
|---|---|
| $C_{ges}$: | 6.01% |
| $C_{free}$: | <0.02% |
| O: | 0.28% |
| FSSS ASTM B 330 - 88: | 4.4 μm |
| FSSS lab milled ASTM B430: | 0.35 μm |

From this WC, without any further pretreatment, 0.4 kg of hard metal charge comprising 10% Co and 0.8% VC was produced in a laboratory tritor by 5 hours of grinding with hard metal balls in ethanol. The charge stock was vacuum-dried, pelletized, pressed and sintered for 90 min. (30 min. thereof at 30 bar Ar) at 1380° C.

The hard metal exhibits the following characteristic values:

Porosity A<02 B00 C00
Density 14.43 g/cm$^3$
MS 130*10$^{-7}$Tm$^3$/kg
HcJ 44.86 kA/m
HV30 2023

EXAMPLE 5

In a fluidized-bed reactor having a diameter of 150 mm, 7.5 kg of powdery technical tungsten blue oxide with a particle size of about 12 μm (FSSS) was fluidized while being flushed with argon (32 l/min), was heated to 250° C. within 55 minutes and was maintained at that temperature for 50 minutes in order to drive out any remaining ammonia contained in the technical tungsten blue oxide. Thereupon, the tungsten blue oxide was heated to 640° C. within 1.5 hours. Upon reaching said temperature, the reaction was initiated. Thereby, the reaction gas consisting of 80% by volume of carbon monoxide and 20% by volume of hydrogen was admixed to the argon. In order to be able to keep the total gas flow constant at around 32 l/min in doing so, the flow rate of the argon was gradually decreased (in 5–10 minutes by 1–2 l/min at a time) whereas the flow rate of the reaction gas was increased to the same degree.

From the beginning of the reaction, the powder was heated to 820° C. within 4 hours. The gas exchange lasted for 8.7 hours. The total gas flow then amounted to 32 l/min of carbon monoxide and 8 l/min of hydrogen. Within 2.5 hours, the flow rate of the reaction gas was gradually increased further to 38 l/min of carbon monoxide and 9.5 l/min of hydrogen. After a total reaction time of 17 hours, cooling was performed by argon flushing.

The Tungsten Carbide Thus Obtained had the Following Composition:

| | |
|---|---|
| O: | 0.25% |
| $C_{tot}$: | 5.97% |
| $C_{free}$: | 0.02% |
| FSSS ASTM B 330 - 88: | 3.25 μm |
| FSSS lab milled ASTM B 430: | 0.89 μm |
| Por as: | 0.8 |
| Por lm: | 0.58 |
| BET: | 1.96 m$^2$/g |
| Lattice constant a: | 2.90 Å ± 0.01 Å |
| Lattice constant c: | 2.86 Å ± 0.01 Å |

The invention claimed is:

1. A tungsten carbide having a lattice distance x in the c-direction, of $2.850 < x \leq 2.870$ Angström, having a content of bound carbon in a range of from 5.86% to 6.08% by weight, wherein the tungsten carbide is monophasic.

2. The tungsten carbide of claim 1, wherein the tungsten carbide is produced by a direct carburization method comprising: (i) heating a starting material comprising tungsten-oxide to a first temperature greater than or equal to 600° C., (ii) reacting the heated starting material with a reaction gas while increasing the temperature to a second temperature that does not exceed 850° C.;
   wherein the reaction gas is selected from the group consisting of CO and a $COH_2$ gas mixture comprising up to 20% by volume $H_2$.

3. A hard metal comprising a tungsten carbide according to claim 1.

4. A hard metal comprising a tungsten carbide according to claim 2.

* * * * *